Oct. 31, 1933.  W. R. HUNT  1,933,173
ELECTRICALLY HEATED BATHROOM MIRROR
Filed Feb. 24, 1933
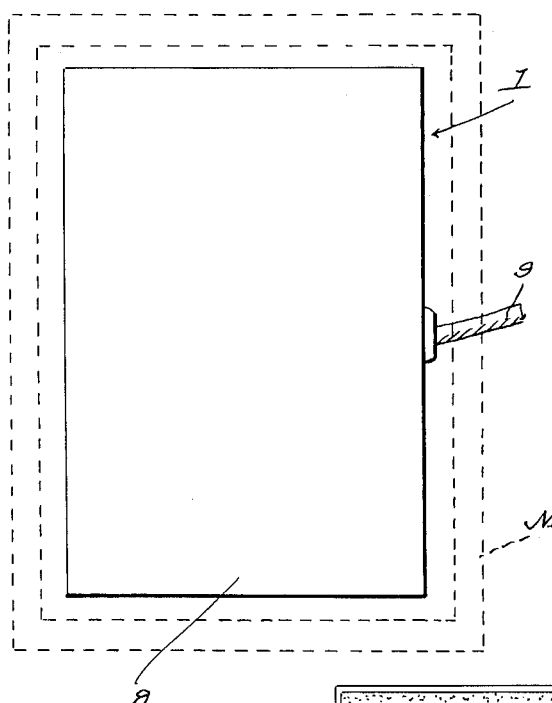
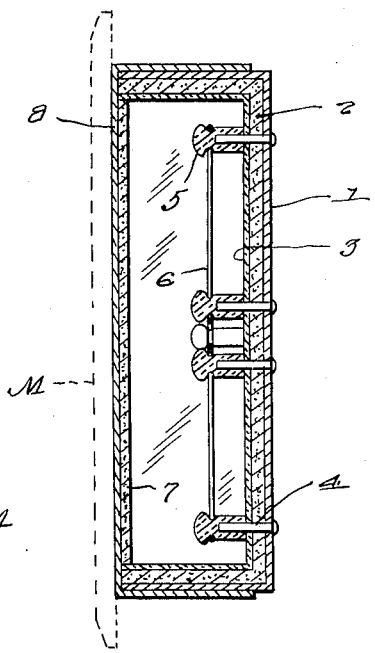
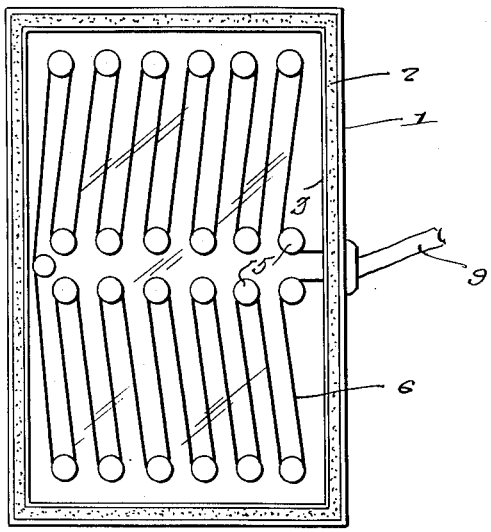
Inventor
William R. Hunt
By Clarence A. O'Brien
Attorney Patented Oct. 31, 1933

1,933,173

UNITED STATES PATENT OFFICE 1,933,173

ELECTRICALLY HEATED BATHROOM MIRROR

William R. Hunt, Santa Barbara, Calif.

Application February 24, 1933. Serial No. 658,455

1 Claim. (Cl. 219—19)

This invention relates to an electrically heated bathroom mirror, the general object of the invention being to provide a casing located in rear of the mirror and contacting the same and having an electric heating unit therein for heating the mirror, whereby fogging of the mirror is prevented and a clear reflection is maintained.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is a front view of the device, with the mirror shown in dotted lines.

Figure 2 is a vertical sectional view through the device, with the mirror shown in dotted lines.

Figure 3 is a view looking into the device, with the cover and the front layer of asbestos removed.

In this drawing, the numeral 1 indicates a casing preferably formed of metal and having its front open and the numeral 2 indicates a lining of asbestos covering the inner face of the rear part of the casing and the side walls thereof. A lining 3 of mica is placed on the asbestos. Posts 4 pass through the rear wall of the casing and through the asbestos and mica and these posts may be welded to the rear wall of the casing and posts 5 of non-conducting material have bores therein for receiving the projecting parts of the posts 4. The posts 5 are grooved to receive the wires 6 of the electric heating element so that this element is supported within the casing and in spaced relation from the mica lining.

A sheet 7 of asbestos or the like extends over the front of the opening formed by the casing and the linings 2 and 3 and a lid 8 telescopes over the casing and contacts the sheet 7.

As shown in Figures 1 and 2, the front face of the lid contacts the rear of the mirror, shown at M in dotted lines, so that when the current is flowing through the heating element, the mirror will be heated and there should be a sufficient amount of current passing through the heating element to heat the entire mirror to a degree of warmth above the bathroom atmospheric temperature, and particularly above the temperature of the human breath or exhalation. The warming of the entire mirror prevents moisture condensation on the front surface of the mirror, thereby preventing fogging and maintaining clear reflection.

The drawing shows the conductors 9 for supplying current to the heating element as passing from a side of the casing, but it will be understood that, if desired, a plug may be placed in a side of the casing and connected to the heating element so that another plug can be inserted therein and connected to a source of supply.

If desired, the device can be placed in a medicine cabinet in the bathroom in such a position as to contact the mirror in the door of the cabinet and means may be provided for indicating when the current is flowing through the heating element and when it is cut off therefrom.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

Means for heating a bathroom mirror, comprising a casing, a lining of heat insulating material therein, a lining of heat resisting and translucent material covering the first mentioned lining, posts of non-conducting material supported in the casing, a heating element composed of wires supported by said posts, means for connecting the heating element to a source of supply, a sheet of heat insulating material closing the front of the casing and a lid closing the front of the casing and contacting the rear face of the mirror.

WILLIAM R. HUNT.